United States Patent [19]

Kim

[11] Patent Number: 5,442,603
[45] Date of Patent: Aug. 15, 1995

[54] DIGITAL AUDIO REPETITIVE REPRODUCTION SYSTEM

[75] Inventor: Dong G. Kim, Seoul, Rep. of Korea

[73] Assignee: Hyundai Electronics Industries, Ltd., Kyungki-Do, Rep. of Korea

[21] Appl. No.: 163,535

[22] Filed: Dec. 9, 1993

[30] Foreign Application Priority Data

Dec. 30, 1992 [KR] Rep. of Korea .................. 92-26393

[51] Int. Cl.⁶ .......................... G11B 17/22; G11B 7/00
[52] U.S. Cl. ...................................... 369/32; 369/124
[58] Field of Search ...................... 369/32, 33, 47, 48,
369/124; 358/342, 343; 360/19.1, 10.1, 10.2, 10.3, 11.1, 27

[56] References Cited

U.S. PATENT DOCUMENTS

| | | | |
|---|---|---|---|
| 3,703,041 | 11/1972 | Kohtani | 360/13 |
| 4,445,145 | 4/1984 | Moriya | 360/10.2 |
| 4,499,503 | 2/1985 | Suzuki | 358/343 |
| 4,703,369 | 10/1987 | Moriyama et al. | 360/19.1 |
| 5,146,347 | 9/1992 | Kawakami et al. | 358/342 |

Primary Examiner—Georgia Y. Epps
Assistant Examiner—Tan Dinh
Attorney, Agent, or Firm—Foley & Lardner

[57] ABSTRACT

A digital audio repetitive reproduction system provided with a compact disc operating circuit for operating a compact disc to read an audio signal from the compact disc, a radio frequency processing circuit for processing the read audio signal from the compact disc operating circuit in a radio frequency form, a digital signal processing circuit for processing the resultant radio frequency signal in a digital form, a digital/analog converter for converting the resultant digital audio data from the digital signal processing circuit into an analog audio signal, a microcomputer for outputting a plurality of control signals to control the entire operation of the system and a servo mechanism for controlling the compact disc operating circuit in response to the corresponding control signal from the microcomputer. The system includes a memory unit connected to the digital signal processing circuit to store the digital audio data from the digital signal processing circuit and a switching circuit connected among the memory unit, the digital signal processing circuit and the digital/analog converter to select one of the digital audio data from the memory unit and the digital signal processing circuit in response to the corresponding control signals from the microcomputer and outputting the selected digital audio data to the digital/analog converter.

6 Claims, 3 Drawing Sheets

DIGITAL AUDIO REPETITIVE REPRODUCTION SYSTEM

BACKGROUND OF THE INVENTION

1. Field of the Invention

The present invention relates to a digital audio repetitive reproduction system in which digital audio data is stored in a memory unit and the stored digital audio data is outputted from the memory unit when a repetitive reproduction is required by the user, so that a processing time of a pickup can be removed in the repetitive reproduction, resulting in a reduction in the entire processing time of the system.

2. Description of the Prior Art

Referring to FIG. 1, there is shown a block diagram of a conventional digital audio repetitive reproduction system for a compact disc player (CDP). As shown in this drawing, the conventional digital audio repetitive reproduction system comprises a digital signal processing circuit 3 for outputting digital audio data. The digital audio data from the digital signal processing circuit 3 is applied through a digital filter 6 to a digital/analog (D/A) converter 7, which converts the applied digital audio data into an analog audio signal. The analog audio signal from the D/A converter 7 is outputted to a speaker 9 through a low pass filter (LPF) 8. In the case where the user requires a repetitive reproduction, namely, the user intends to repeatedly listen to a desired audio portion, a microcomputer 5 applies a command signal to a servo mechanism 4 to move an information detection point of a pickup to a position of a compact disc corresponding to the desired audio portion.

However, the conventional digital audio repetitive reproduction system has a disadvantage in that a considerable amount of time is required in moving the information detection point of the pickup to the position of the compact disc corresponding to the desired audio portion.

Also, in a CDP control system which is shown in U.S. Pat. No. 5,146,347, a spindle motor is compulsorily stopped at the moment that a power source of the CDP is turned from an OFF state to an ON state and the information detection point of the pickup is moved to a standby position in a lead-in area of the compact disc, in order to reduce the time required in returning to the lead-in area of the compact disc. However, similarly, in the above-mentioned CDP control system, considerable time is required in moving the information detection point of the pickup from the lead-in area to the position of the compact disc to be repeatedly reproduced.

SUMMARY OF THE INVENTION

Therefore, the present invention has been made in view of the above problem, and it is an object of the present invention to provide a digital audio repetitive reproduction system in which digital audio data is stored in a memory unit and the stored digital audio data is output from the memory unit in response to an address from a microcomputer when a repetitive reproduction is required by the user, so that the repetitive reproduction can be performed rapidly and processing time of a pickup can be removed in the repetitive reproduction, resulting in a reduction in the entire processing time of the system.

In accordance with the present invention, the above and other objects can be accomplished by a provision of a digital audio repetitive reproduction system comprising compact disc operating means for operating a compact disc to read an audio signal from the compact disc, radio frequency processing means for processing the read audio signal from said compact disc operating means in a radio frequency form and outputting the resultant radio frequency signal, digital signal processing means for processing the radio frequency signal from said radio frequency processing means in a digital form and outputting the resultant digital audio data, digital/analog conversion means for converting the digital audio data from said digital signal processing means into an analog audio signal, system control means for outputting a plurality of control signals to control the entire operation of the system and servo means for controlling said compact disc operating means in response to the corresponding control signal from said system control means, wherein the improvement comprises memory means connected to said digital signal processing means to store the digital audio data from said digital signal processing means; and switching means connected among said memory means, said digital signal processing means and said digital/analog conversion means to select one of the digital audio data from said memory means and said digital signal processing means in response to the corresponding control signals from said system control means and outputting the selected digital audio data to said digital/analog conversion means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
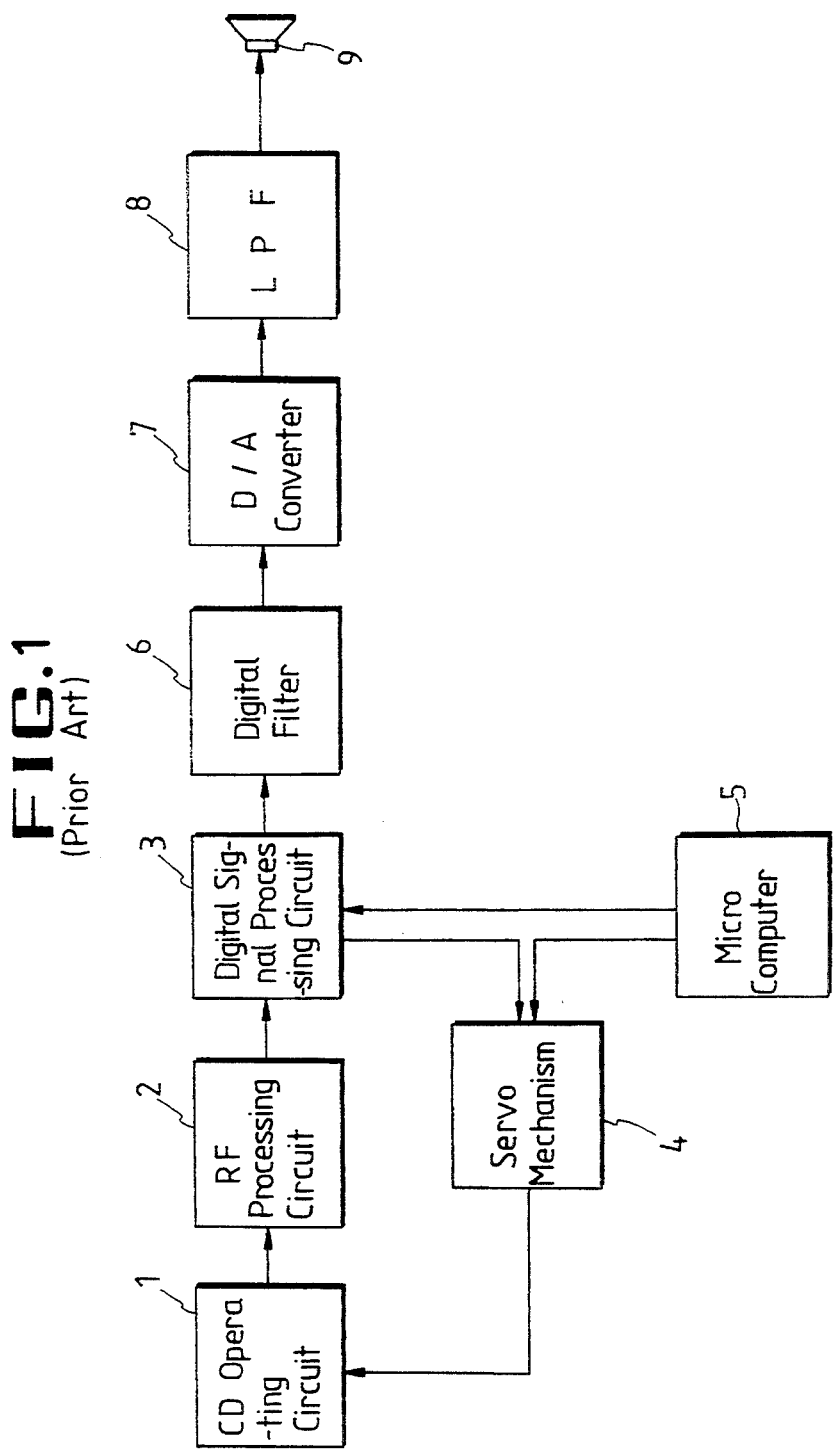
FIG. 1 is a block diagram of a conventional digital audio repetitive reproduction system.
Figure 2:
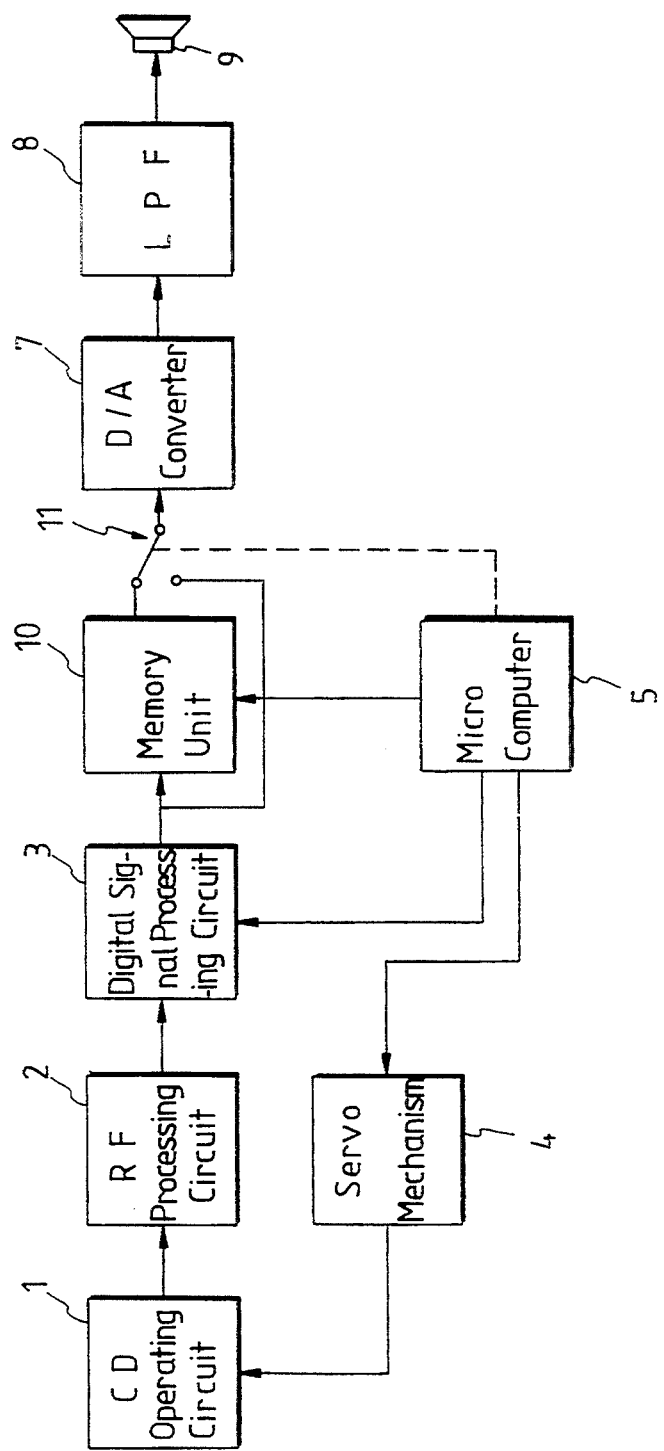
FIG. 2 is a block diagram of a digital audio repetitive reproduction system in accordance with the present invention.

Referring to FIG. 2, there is shown a block diagram of a digital audio repetitive reproduction system in accordance with the present invention. In this drawing, some of parts are the same as those in FIG. 1. Therefore, like reference numerals designate like parts.

As shown in FIG. 2, the digital audio repetitive reproduction system comprises a compact disc (CD) operating circuit 1 for operating a CD to read an audio signal from the CD and a radio frequency (RF) processing circuit 2 for processing the read audio signal from the CD operating circuit 1 in a RF form and outputting the resultant RF signal. The CD operating circuit 1 has a pickup (not shown) for reading the audio signal from the CD.

The digital signal processing circuit 3 is adapted to process the RF signal from the RF processing circuit 2 in a digital form and output the resultant digital audio data.

The digital/analog (D/A) converter 7 is adapted to convert the digital audio data from the digital signal processing circuit 3 into the analog audio signal. The analog audio signal from the D/A converter 7 is outputted to the speaker 9 through the low pass filter (LPF) 8.

The microcomputer 5 is adapted to output a plurality of control signals to control the entire operation of the system.

The servo mechanism 4 is adapted to control the CD operating circuit 1 in response to the corresponding control signal from the microcomputer 5.

A memory unit 10 is connected to the digital signal processing circuit 3 to store the digital audio data from the digital signal processing circuit 3.

A switching circuit 11 is provided to connect either the memory unit 10, or the digital signal processing circuit 3 to the D/A converter 7 to select one of the digital audio data from the memory unit 10 and the digital signal processing circuit 3 in response to a corresponding control signals from the microcomputer 5 and to output the selected digital audio data to the D/A converter 7.

In a normal reproduction, the switching circuit 11 transfers the digital audio data from the digital signal processing circuit 3 directly to the D/A converter 7. In a repetitive reproduction, the switching circuit 11 transfers the digital audio data stored in a location of the memory unit 10 corresponding to an address from the microcomputer 5 to the D/A converter 7.

Figure 3:
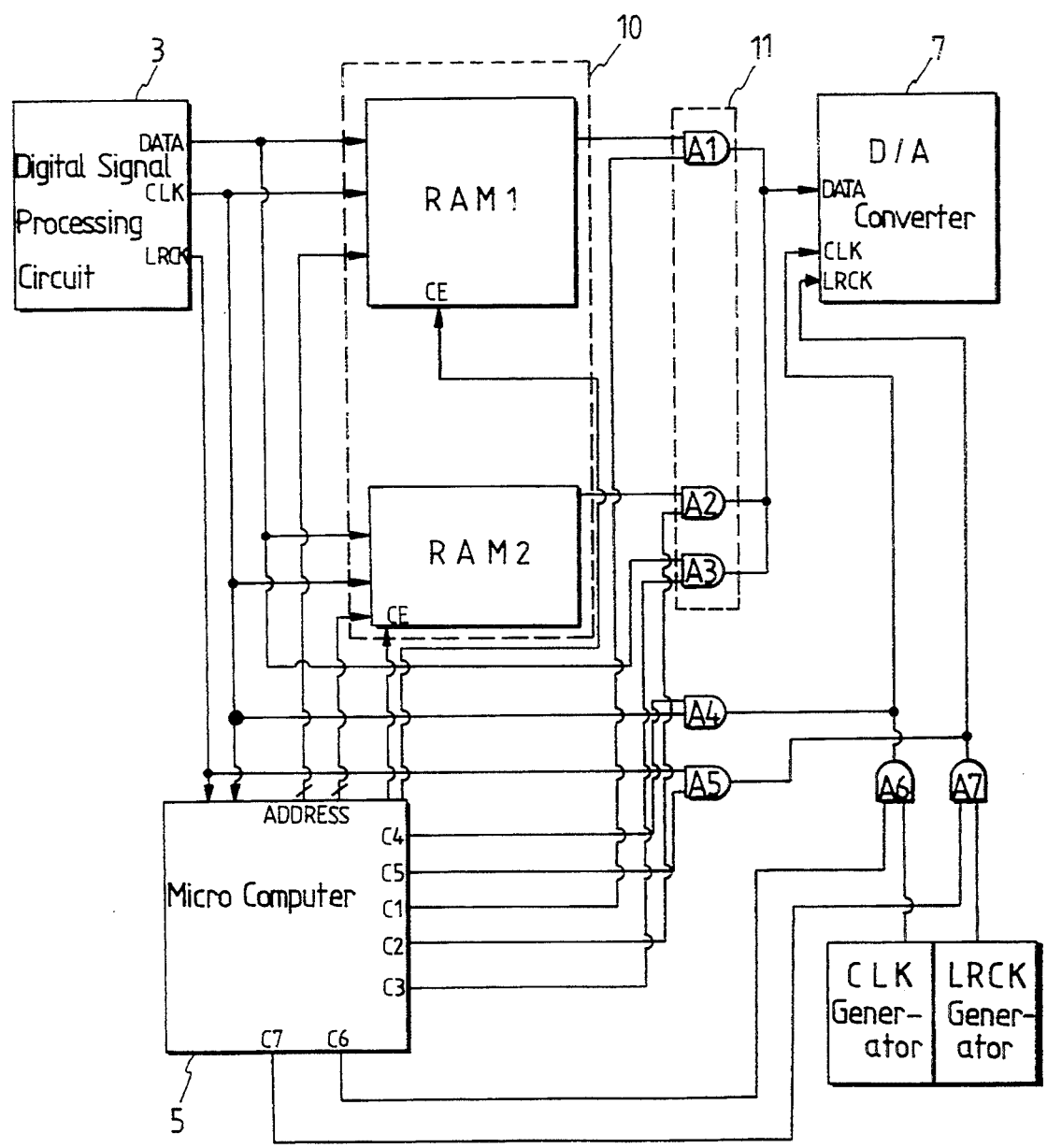
FIG. 3 is a detailed circuit diagram of the digital audio repetitive reproduction system in accordance with the present invention.

Referring to FIG. 3, there is shown a detailed circuit diagram of the digital audio repetitive reproduction system in accordance with the present invention. As shown in this drawing, the memory unit 10 is provided with a pair of random access memories (RAMs) RAM1 and RAM2 for left and right channels.

The switching circuit 11 is provided with three AND gates A1-A3. The AND gate A1 inputs the digital audio data from RAM1 of the memory unit 10 and the corresponding control signal from the microcomputer 5. The AND gate A2 inputs the digital audio data from RAM2 of the memory unit 10 and the corresponding control signal from the microcomputer 5. The AND gate A3 inputs the digital audio data from the digital signal processing circuit 3 and the corresponding control signal from the microcomputer 5.

Here, the reference numerals A4-A7, not described, designate AND gates, respectively.

The operation of the digital audio repetitive reproduction system with the above-mentioned construction in accordance with the present invention will hereinafter be described in detail.

In the normal reproduction, the read audio signal from the CD operating circuit 1 is applied to the digital signal processing circuit 3 through the RF processing circuit 2 The resultant digital audio data from the digital signal processing circuit 3 is applied to RAM1 and RAM2 of the memory unit 10 for left and right channels and also to the AND gate A3 in the switching circuit 11, which also receives the control signal from a control terminal C3 of the microcomputer 5. The control signal from the control terminal C3 of the microcomputer 5 is logical high in the normal reproduction. As a result, the AND gate A3 in the switching circuit 11 transfers the digital audio data from the digital signal processing circuit 3 to the D/A converter 7 in response to the high control signal from the control terminal C3 of the microcomputer 5. The D/A converter 7 converts the digital audio data from the digital signal processing circuit 3 transferred through the switching circuit 11 into the analog audio signal and outputs the analog audio signal to the speaker 9 through the low pass filter 8.

When the repetitive reproduction is required by the user in the middle of the normal reproduction as mentioned above, the microcomputer 5 outputs the address corresponding to a position of the CD which is required by the user to the memory unit 10. As a result, the memory unit 10 outputs the digital audio data stored in its location corresponding to the address from the microcomputer 5 to the switching circuit 11.

The digital audio data from the memory unit 10 is applied to the AND gates A1 and A2 in the switching circuit 11, which also receive the control signals from control terminals C1 and C2 of the microcomputer 5, respectively. In the repetitive reproduction, the control signals from the control terminals C1 and C2 of the microcomputer 5 are logical high, whereas the control signal from the control terminal C3 of the microcomputer 5 is logical low. Subsequently, the AND gates A1 and A2 in the switching circuit 11 transfer the digital audio data from the memory unit 10 to the D/A converter 7 in response to the high control signals from the control terminals C1 and C2 of the microcomputer 5. The D/A converter 7 converts the digital audio data from the memory unit 10 transferred through the switching circuit 11 into the analog audio signal and outputs the analog audio signal to the speaker 9 through the low pass filter 8.

As mentioned above, the switching operations of the AND gates A1-A3 in the switching circuit 11 are performed in response to the control signals from the control terminals C1-C3 of the microcomputer 5. Therefore, in the repetitive reproduction, the digital audio data is output from the memory unit 10 by the switching operations of the AND gates A1-A3 in the switching circuit 11, with no use of the pickup.

As apparent from the above description, according to the present invention, the repetitive reproduction can rapidly be performed with the use of the memory unit and the processing time of the pickup can be removed in the repetitive reproduction, resulting in a reduction in the entire processing time of the system. Also, the present invention may be applied to a video signal processing system. In this case, video data from a video signal processing circuit is stored in the memory unit and the stored video data is outputted from the memory unit when a still picture reproduction is required by the user. Therefore, a definite picture can rapidly be displayed on a screen. Namely, the present invention may effectively be applied to a still picture process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A digital audio repetitive reproduction system comprising:
   compact disc operating means for operating a compact disc to read an audio signal from the compact disc;
   radio frequency processing means for processing the read audio signal from said compact disc operating means in a radio frequency form and outputting a resultant radio frequency signal;
   digital signal processing means for processing the radio frequency signal from said radio frequency processing means in a digital form and outputting resultant digital audio data;

digital/analog conversion means for converting the digital audio data from said digital signal processing means into an analog audio signal;

system control means for outputting a plurality of control signals to control operation of the system;

servo means for controlling said compact disc operating means in response to a corresponding control signal from said system control means;

memory means connected to said digital signal processing means for storing the digital audio data from said digital signal processing means; and switching means connected between said memory means, said digital signal processing means and said digital/analog conversion means to select digital audio data from one of said memory means and said digital signal processing means in response to control signals from said system control means and outputting the selected digital audio data to said digital/analog conversion means.

2. A digital audio repetitive reproduction system as set forth in claim 1, wherein said switching means includes:

a first AND gate for inputting the digital audio data from said memory means and a first control signal from said system control means;

a second AND gate for inputting the digital audio data from said memory means and a second control signal from said system control means; and a third AND gate for inputting the digital audio data from said digital signal processing means and a third control signal from said system control means.

3. A device for repetitively reproducing a digital signal representing stored information retrieved from a compact disc, comprising:

a microcomputer outputting a plurality of control signals including a mode control signal indicating one of a repetitive mode and a non-repetitive mode;

a reading unit, said reading unit reading digital information from said compact disk and producing a digital signal under control of said microcomputer;

a processing circuit connected to receive said digital signal, said processing circuit processing said digital signal into digital data;

a memory unit connected to receive said digital data from said processing circuit, said memory unit storing said digital data at a particular address in said memory unit;

an output circuit connected to an external reproduction device; and a switching circuit connected between said processing circuit, said memory unit and said output circuit, wherein said switching circuit is responsive to said mode control signal to supply said digital data directly from said processing circuit to said output circuit when said mode control signal indicates said non-repetitive mode and to supply said digital data from said particular address in said memory unit to said output circuit when said mode control signal indicates said repetitive mode.

4. A device as recited in claim 3, wherein said digital information represents audio information and said digital data represents an audio signal.

5. A device as recited in claim 4, wherein said memory unit comprises a first RAM and a second RAM, said first RAM storing a left channel of said audio signal and said second RAM storing a right channel of said audio signal.

6. A device as recited in claim 3, wherein:

said digital information represents video information;

said processing circuit comprises a video signal processing circuit for producing video data as said digital data; and said repetitive mode is selected when a still picture reproduction of a portion of said video information is desired.

* * * * *